(12) United States Patent
Hayakawa et al.

(10) Patent No.: US 8,191,432 B2
(45) Date of Patent: Jun. 5, 2012

(54) LOAD DETECTING DEVICE INCLUDING A LOAD DETECTING ELEMENT BETWEEN A SUBSTRATE AND A LOAD RECEIVER AND METHOD OF PRODUCING THE SAME

(75) Inventors: Hideyuki Hayakawa, Nishio (JP); Toshio Hosokawa, Anjo (JP); Kenji Morikawa, Hekinan (JP)

(73) Assignee: Denso Corporation, Kariya (JP)

( * ) Notice: Subject to any disclaimer, the term of this patent is extended or adjusted under 35 U.S.C. 154(b) by 253 days.

(21) Appl. No.: 12/661,021

(22) Filed: Mar. 9, 2010

(65) Prior Publication Data

US 2010/0229655 A1 Sep. 16, 2010

(30) Foreign Application Priority Data

Mar. 11, 2009 (JP) .................................. 2009-057669

(51) Int. Cl.
*G01L 1/00* (2006.01)
(52) U.S. Cl. .............................. 73/862.381; 73/862.041
(58) Field of Classification Search ............. 73/862.041–862.046, 862.381, 73/862.391
See application file for complete search history.

(56) References Cited

U.S. PATENT DOCUMENTS

| | | | | |
|---|---|---|---|---|
| 4,216,401 A * | 8/1980 | Wagner | ...................... | 310/313 R |
| 4,695,963 A * | 9/1987 | Sagisawa et al. | ............ | 700/258 |
| 5,295,399 A * | 3/1994 | Grant et al. | .............. | 73/862.043 |
| 6,823,744 B2 * | 11/2004 | Ohsato et al. | ............ | 73/862.041 |
| 6,914,406 B1 * | 7/2005 | Wilkes et al. | ................. | 318/685 |
| 6,990,867 B2 * | 1/2006 | Okada | ............................ | 73/780 |
| 7,536,922 B2 * | 5/2009 | Sakurai et al. | ........... | 73/862.041 |
| 7,594,445 B2 * | 9/2009 | Hirabayashi et al. | .... | 73/862.044 |
| 7,757,571 B2 * | 7/2010 | Hirabayashi et al. | .... | 73/862.626 |
| 2005/0160836 A1 | 7/2005 | Hayakawa et al. | | |
| 2007/0193682 A1 | 8/2007 | Sasaoka et al. | | |

FOREIGN PATENT DOCUMENTS

| | | |
|---|---|---|
| JP | 6-137806 | 5/1994 |
| JP | 10-325768 | 12/1998 |
| JP | 11-214707 | 8/1999 |
| JP | 2003-83820 | 3/2003 |
| JP | 2008-190890 | 8/2008 |

* cited by examiner

*Primary Examiner* — Max Noori
(74) *Attorney, Agent, or Firm* — Harness, Dickey & Pierce, PLC

(57) ABSTRACT

A load detecting device includes a substrate, a load receiver arranged on a first face of the substrate, a load detecting element arranged between the substrate and the load receiver, and a supporting portion to support the substrate. The supporting portion is made of metal. The supporting portion is located to overlap with the load receiver in a direction approximately perpendicular to the substrate. The supporting portion has a plurality of projections contacting with a second face of the substrate opposite from the first face. The projections located adjacent to each other are distanced from each other through a trench.

11 Claims, 7 Drawing Sheets

LOAD DETECTING DEVICE INCLUDING A LOAD DETECTING ELEMENT BETWEEN A SUBSTRATE AND A LOAD RECEIVER AND METHOD OF PRODUCING THE SAME

CROSS REFERENCE TO RELATED APPLICATION

This application is based on Japanese Patent Application No. 2009-57669 filed on Mar. 11, 2009, the disclosure of which is incorporated herein by reference in its entirety.

BACKGROUND OF THE INVENTION

1. Field of the Invention

The present invention relates to a load detecting device, and a method of producing the load detecting device.

2. Description of Related Art

JP-A-2008-190890 discloses a load detecting element supported by a ball through a board. Further, a rubber portion is arranged between the load detecting element and the board, such that a load to be detected can be uniformly applied to the load detecting element.

However, the rubber portion is an elastic member, and elasticity of the elastic member is lowered over time, such that the uniform applying of load may not able to be maintained for a long time. Therefore, a load to be detected is required to be uniformly applied to a load detecting element without an elastic member.

SUMMARY OF THE INVENTION

In view of the foregoing and other problems, it is an object of the present invention to provide a load detecting device, and a method of producing the load detecting device.

According to a first example of the present invention, a load detecting device includes a substrate, a load receiver arranged on a first face of the substrate so as to receive a load, a load detecting element arranged between the substrate and the load receiver so as to detect the load, and a supporting portion to support the substrate. The supporting portion is made of metal, and is located to overlap with the load receiver in a direction approximately perpendicular to the substrate. The supporting portion has a plurality of projections contacting with a second face of the substrate opposite from the first face. The projections located adjacent to each other are distanced from each other through a trench.

Accordingly, detection accuracy of the load detecting device can be increased.

According to a second example of the present invention, a method of producing a load detecting device includes an arranging of a load receiver on a first face of a substrate through a load detecting element. The producing method includes an arranging of a supporting portion on a second face of the substrate opposite from the first face. The supporting portion has a plurality of projections contacting with the second face of the substrate. The projections located adjacent to each other are distanced from each other through a trench. The producing method includes a forming of a flat face on a curved face of the projection of the supporting portion. The arranging of the supporting portion is performed such that the supporting portion is located to overlap with the load receiver in a direction approximately perpendicular to the substrate. The forming of the flat face is performed by applying a load on the load receiver, such that the flat face of the projection is fitted to the second face of the substrate.

Accordingly, detection accuracy of the load detecting device can be increased.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

A load detecting device 1 is used for detecting a load applied to a brake pedal of an automobile, for example.

Figure 1:
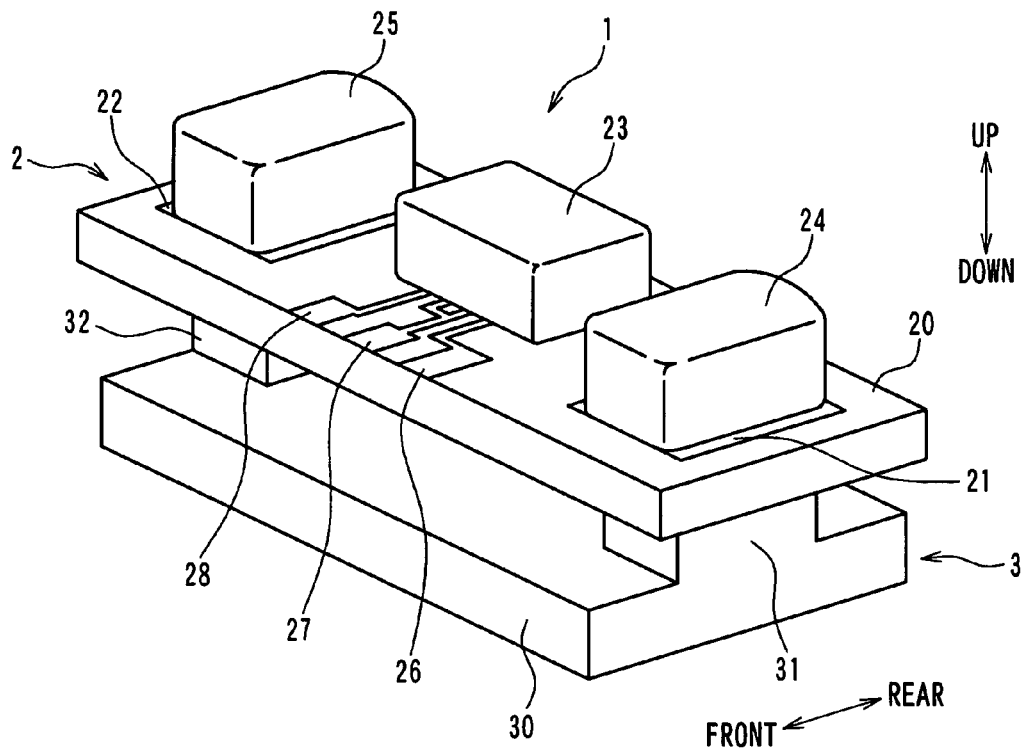
FIG. 1 is a schematic perspective view illustrating a load detecting device of an embodiment.

As shown in FIG. 1, the load detecting device 1 includes a substrate 2, and a metal base 3 mounted to a lower side of the substrate 2. The substrate 2 and the metal base 3 are fixed to an assembling member (not shown), such that a position of the metal base 3 can be set relative to the substrate 2. Front, rear, up and down directions of FIGS. 1-6 are defined to describe the device 1 for a convenience.

Figure 2:
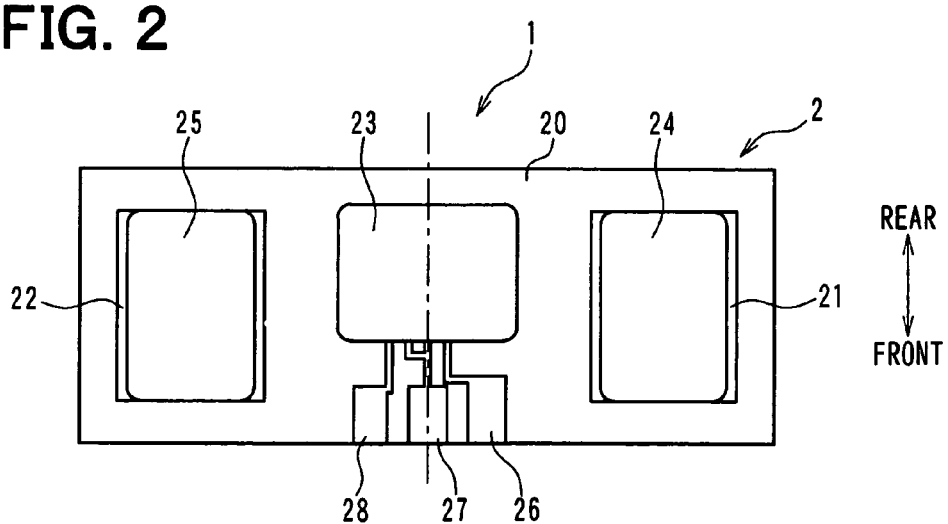
FIG. 2 is a schematic plan view illustrating the load detecting device.

As shown in FIGS. 1 and 2, the substrate 2 has a ceramic wiring board 20, first and second pressure sensitive resistors 21, 22, a load detecting IC 23, first and second load receivers 24, 25, and outside connecting terminals 26, 27, 28. The pressure sensitive resistor 21, 22 may correspond to a load detecting element, and the load detecting IC 23 may correspond to a load detecting circuit. The pressure sensitive resistors 21, 22, the load detecting IC 23, and the terminals 26, 27, 28 are omitted in FIGS. 3-8 for a convenience.

The wiring board 20 is made of ceramic, and has a predetermined rigidity and a rectangular shape. The pressure sensitive resistors 21, 22, the load detecting IC 23 and the terminals 26, 27, 28 are surface-mounted on the board 20, and are connected through wirings. The board 20 has a thickness of 1.75 mm, for example.

The pressure sensitive resistor 21, 22 is arranged on an upper face of the board 20. Electric characteristics of the resistors 21, 22 are varied when a stress is applied to the resistor 21, 22. The resistor 21, 22 has a rectangular film shape. Specifically, the resistor 21, 22 is made of a pressure sensitive member, and a resistance of the resistor 21, 22 is varied when a load is applied to the resistor 21, 22.

As shown in FIG. 2, the resistors 21, 22 are arranged in a longitudinal direction of the board 20. Specifically, a paste material containing conductive particles of $RuO_2$ and glass is screened on the board 20, and the screened material is printed, such that the resistor 21, 22 can be formed.

The load receiver 24, 25 is fixed on an upper face of the resistor 21, 22. The resistor 21, 22 is arranged between the receiver 24, 25 and the board 20. When a load is applied to the receiver 24, 25 from outside, the receiver 24, 25 uniformly transmits the load to a whole area of the resistor 21, 22. The receiver 24, 25 is made of ceramic, and has a predetermined rigidity and a rectangular solid shape.

As shown in FIG. 1, the receiver 24, 25 has a height higher than that of the IC 23. When a load is transmitted to the resistor 21, 22 through the receiver 24, 25 from outside, a resistance of the resistor 21, 22 is changed by the load.

The IC 23 is mounted on the upper face of the board 20, and is made of a ceramic package. The IC 23 corresponds to a circuit to detect the load based on a variation of the resistance of the resistor 21, 22.

Specifically, the IC 23 calculates the load applied to the receiver 24, 25, based on the variation of the resistance of the resistor 21, 22. The IC 23 converts the calculated load into a signal, and outputs the signal to outside of the device 1 through the terminals 26, 27, 28. An input terminal of the IC 23 is connected to the resistor 21, 22 by a wiring pattern (not shown) on the board 20. The IC 23 detects the resistance of the resistor 21, 22 through the wiring pattern. An output terminal of the board 20 is connected to the terminals 26, 27, 28.

Figure 3:
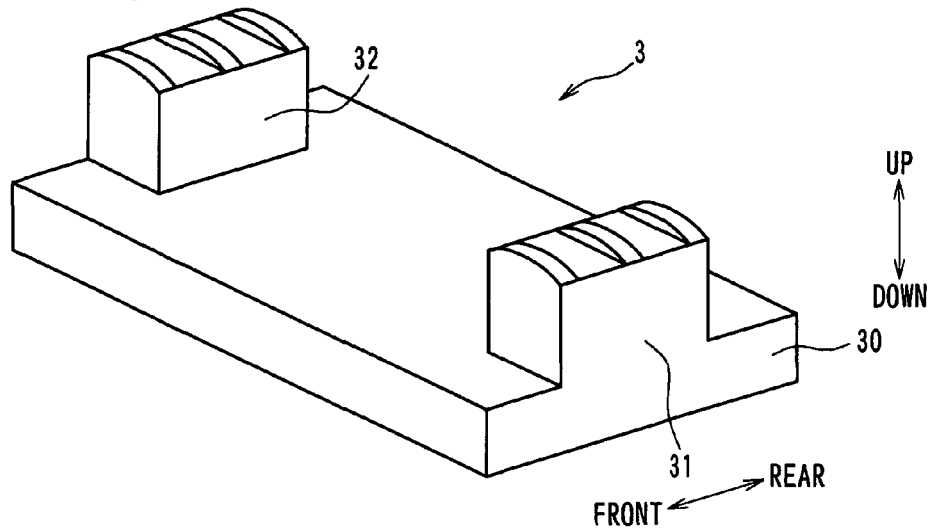
FIG. 3 is a schematic perspective view illustrating a metal base of the load detecting device.

As shown in FIG. 3, the metal base 3 has a rectangular main board 30 and a supporting portion 31, 32. The supporting portion 31, 32 protrudes upward from the board 30, and is located on an end portion of the main board 30 in a longitudinal direction. The supporting portion 31, 32 has an approximately rectangular solid shape. The main board 30 and the supporting portion 31, 32 are integrally made of metal. For example, the metal is a stainless steel such as SUS 304. The supporting portion 31, 32 is located in a manner that a longitudinal direction of the supporting portion 31, 32 is approximately perpendicular to the longitudinal direction of the main board 30.

Figure 4:
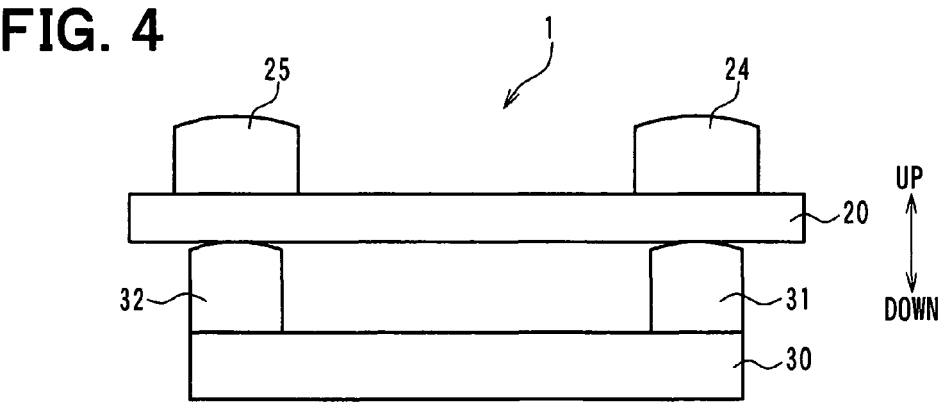
FIG. 4 is a schematic front view illustrating the load detecting device.

As shown in FIG. 4, an upper end of the supporting portion 31, 32 is positioned to contact with a lower end of the board 20, and a part of the board 20 contacting with the supporting portion 31, 32 is located directly under the receiver 24, 25. Therefore, a position of the receiver 24, 25 and a position of the supporting portion 31, 32 are overlap with each other in a direction approximately perpendicular to the board 20.

Figure 5:
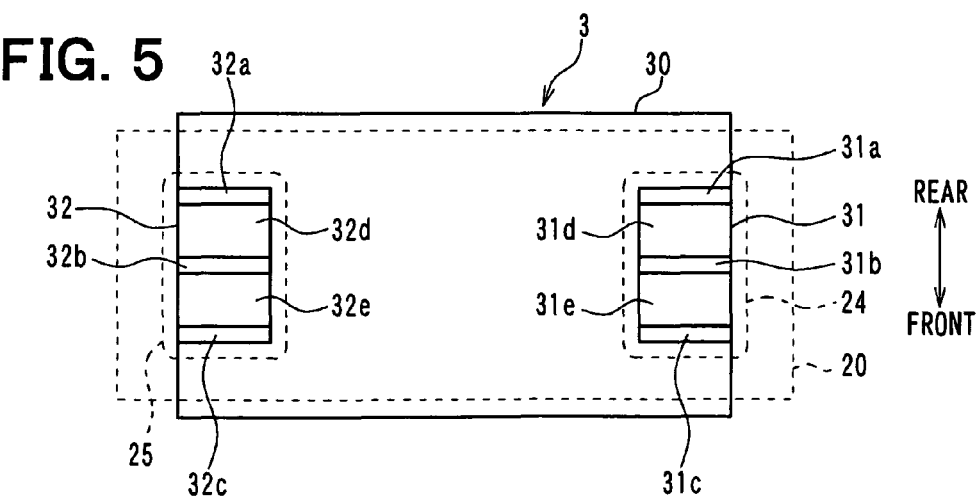
FIG. 5 is a schematic plan view illustrating the metal base.

FIG. 5 shows a plan view of the metal base 3. Positions of the board 20 and the receiver 24, 25 are illustrated in dashed lines of FIG. 5, such that a position relationship between the metal base 3 and the substrate 2 are clarified.

As shown in FIG. 5, the receiver 24, 25 has an approximately rectangular area larger than a rectangular area of the supporting portion 31, 32. Further, all of the rectangular area of the supporting portion 31, 32 is located inside of the rectangular area of the receiver 24, 25.

Figure 6:
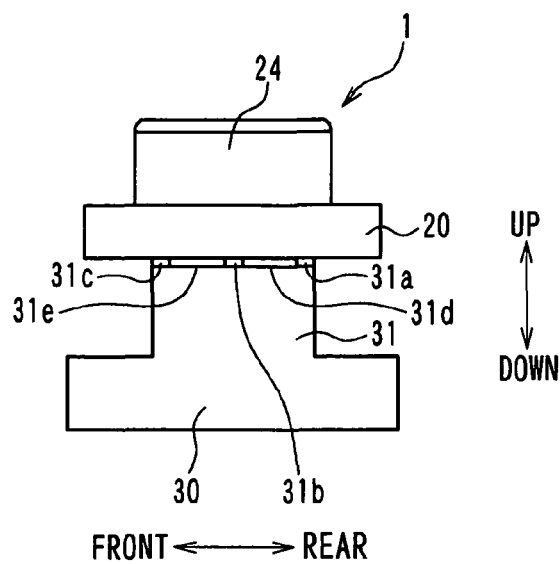
FIG. 6 is a schematic side view illustrating the load detecting device.

As shown in FIG. 6, a face of the supporting portion 31, 32 opposing to the board 20 is located inside of a bottom face of the receiver 24, 25 contacting with the resistor 21, 22. Thus, if a small position deviation is generated when a position of the metal base 3 is set relative to the substrate 2, a contact area between the board 20 and the supporting portion 31, 32 can be located directly under the bottom face of the receiver 24, 25.

A specific construction of the supporting portion 31, 32 will be described. As shown in FIGS. 3 and 4, an upper end face of the supporting portion 31, 32 has a curved shape protruding upward. Further, as shown in FIGS. 3 and 5, the supporting portion 31, 32 has a first trench 31d, 32d and a second trench 31e, 32d extending in a longitudinal direction of the main board 30.

The first trench 31d, 32d is defined between a first projection 31a, 32a and a second projection 31b, 32b, and the second trench 31e, 32e is defined between the second projection 31b, 32b and a third projection 31c, 32c. The first projection 31a, 32a is located on a first end portion of the supporting portion 31, 32 in a longitudinal direction, and the third projection 31c, 32c is located on a second end portion of the supporting portion 31, 32 opposite from the first end portion in the longitudinal direction. The projection 31a, 31b, 31c, 32a, 32b, 32c has a longitudinal direction approximately perpendicular to the longitudinal direction of the supporting portion 31, 32.

The upper face of the supporting portion 31, 32 has the first projection 31a, 32a, the first trench 31d, 32d, the second projection 31b, 32b, the second trench 31e, 32e, and the third projection 31c, 32c, which are arranged in a longitudinal direction of the supporting portion 31, 32, in this order. The projection 31a, 31b, 31c, 32a, 32b, 32c has a curved shape protruding upward. Further, the projections 31a, 31b, 31c, 32a, 32b, 32c are arranged to be separated from each other through the trenches 31d, 31e, 32d, 32e in the longitudinal direction of the supporting portion 31, 32.

The curved shape of the projection 31a, 31b, 31c, 32a, 32b, 32c becomes highest at an approximately center position, in a cross-section perpendicular to the longitudinal direction of the supporting portion 31, 32. The trench 31d, 31e, 32d, 32e has a flat face recessed from the projection 31a, 31b, 31c, 32a, 32b, 32c.

Figure 7:
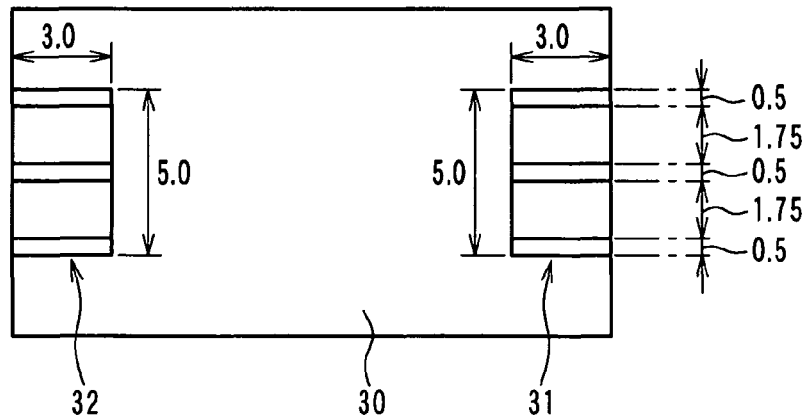
FIG. 7 is a schematic plan view illustrating dimensions of the metal base.
Figure 8:
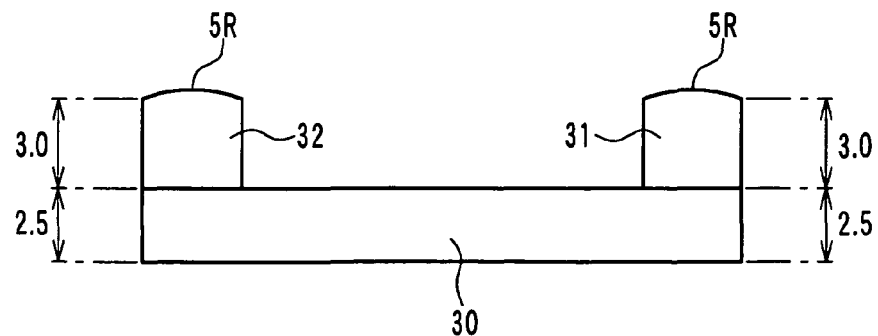
FIG. 8 is a schematic front view illustrating dimensions of the metal base.

FIGS. 7 and 8 show dimensions of the supporting portion 31, 32 in millimeter order. The supporting portion 31, 32 has a longitudinal dimension of 5.0 mm, a lateral dimension of 3.0 mm, and a height of 3.0 mm. The projection 31a, 31b, 31c, 32a, 32b, 32c has a dimension of 0.5 mm in the longitudinal direction of the supporting portion 31, 32. The trench 31d, 31e, 32d, 32e has a dimension of 1.75 mm in the longitudinal direction of the supporting portion 31, 32. The upper face of the projection 31a, 31b, 31c, 32a, 32b, 32c has a curvature radius of 5 mm. The main board 30 of the metal base 3 has a thickness of 2.5 mm.

A method of mounting the device 1 on an automobile, and an operation of the device 1 will be described with reference to FIG. 9. The metal base 3 is fixed to the automobile, when the device 1 is used. A transmitting portion 4 is mounted to an upper side of the receiver 24, 25 so as to transmit a force applied on a brake pedal of the automobile. A lower face of the transmitting portion 4 contacts an upper end face of the receiver 24, 25.

Figure 9:
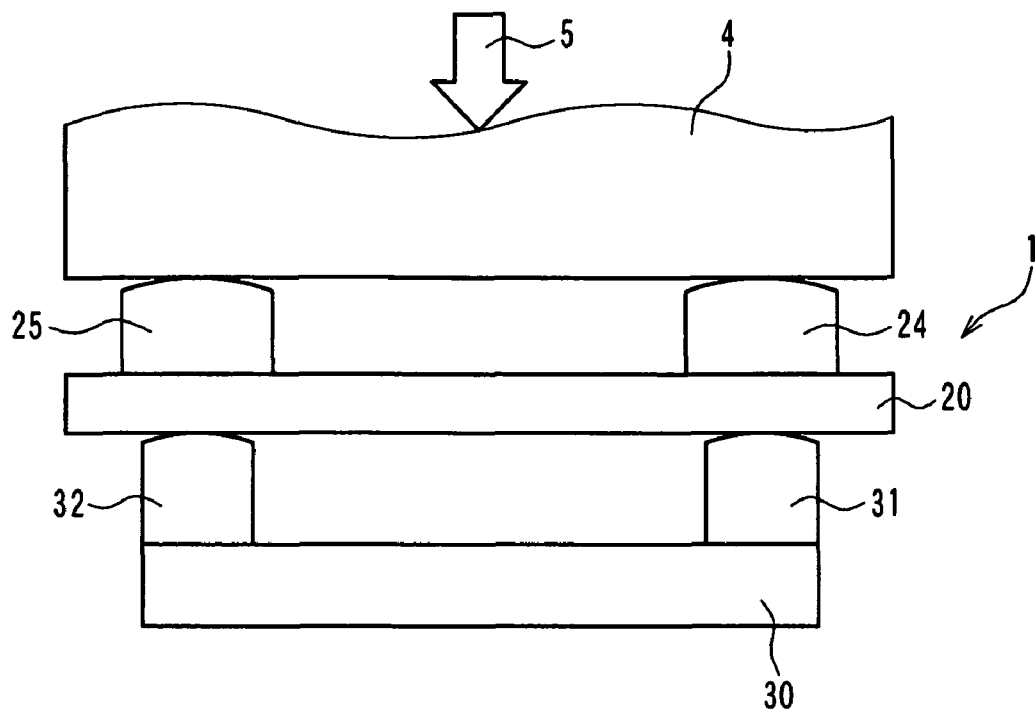
FIG. 9 is a schematic front view illustrating the load detecting device when a load is applied to the load detecting device.

When a force is applied to the brake pedal in an arrow direction 5 of FIG. 9, the force is transmitted to the receiver 24, 25 through the transmitting portion 4. Thus, the receiver 24, 25 is pressed downward.

At this time, a load is applied to the resistor 21, 22 through the receiver 24, 25, such that a resistance of the resistor 21, 22 is varied. The IC 23 calculates the load based on a variation of the resistance, and the calculated load corresponds to the force applied to the brake pedal. The IC 23 converts the calculated load into a signal, and outputs the signal to a brake controlling device, for example, located outside of the device 1 through the terminals 26, 27, 28.

A method of producing the device 1 has a surface fitting process, after the device 1 is mounted on the automobile. The surface fitting process is performed relative to the supporting portion 31, 32 before the device 1 is practically used. The surface fitting process will be described with reference to FIG. 9.

A load is applied to the upper end face of the supporting portion 31, 32 through the transmitting portion 4, the receiver 24, 25, the resistor 21, 22 and the board 20. The load corresponds to a force applied on the brake pedal. Thus, an upper end face of the projection 31a, 31b, 31c, 32a, 32b, 32c of the supporting portion 31, 32 has a plastic deformation.

Figure 10A:
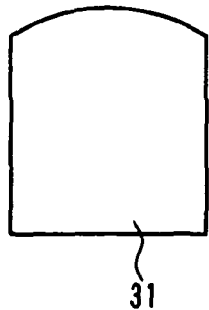
FIG. 10A is a front view illustrating a supporting portion of the metal base before having a surface fitting process.
Figure 10B:
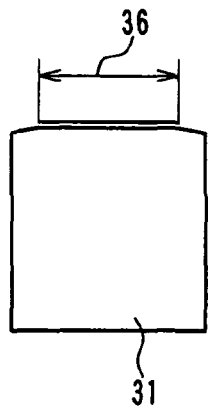
FIG. 10B is a front view illustrating the supporting portion after having a surface fitting process.
Figure 10E:
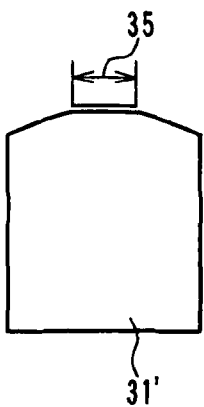
FIG. 10E is a front view illustrating a supporting portion of a comparison example after having a surface fitting process.
Figure 10C:
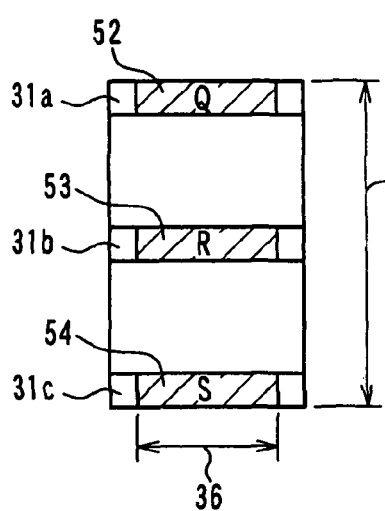
FIG. 10C is a plan view illustrating the supporting portion after having the surface fitting process.

Due to the surface fitting process, a part of the projection 31a, 31b, 31c, 32a, 32b, 32c has a flat face 52, 53, 54 shown in FIG. 10C. The flat face 52, 53, 54 of the projection 31a, 31b, 31c, 32a, 32b, 32c is fitted to the face of the board 20 opposing to the supporting portion 31, 32. Therefore, a contact area between the supporting portion 31, 32 and the board 20 can be increased. Further, a close contact can be achieved between the supporting portion 31, 32 and the board 20 in a surface roughness order. Thus, fatigue of the supporting portion 31, 32 made of metal can be reduced, even when loads are repeatedly applied to the supporting portion 31, 32.

Accordingly, when the device 1 is used, a distribution of a pressure applied to the resistor 21, 22 can be made uniform, and a load-withstanding strength of the resistor 21, 22 can be increased.

However, the surface fitting process is required to be performed by a load not damaging the resistor 21, 22, because a load is applied to the supporting portion 31, 32 through the resistor 21, 22 in the surface fitting process. When a load needed for the surface fitting process is higher than a predetermined load damaging the resistor 21, 22, the surface fitting process may not be performed.

According to the embodiment, the projections 31a, 31b, 31c, 32a, 32b, 32c of the supporting portion 31, 32 are arranged to be separated from each other. The supporting portion 31, 32 supports the board 20 only through the projections 31a, 31b, 31c, 32a, 32b, 32c. Advantages of the embodiment will be described below by using the supporting portion 31. The supporting portion 32 has the same advantages as the supporting portion 31.

FIG. 10A shows the supporting portion 31 before having the surface fitting process. Due to the surface fitting process, the supporting portion 31 is pressed to the board 20, such that the supporting portion 31 has a plastic deformation. A center position of the plastic deformation corresponds to a contact position between the supporting portion 31 and the board 20.

Therefore, after the surface fitting process, as shown in FIG. 10B, an upper end of the supporting portion 31 has a flat part. The flat part corresponds to the flat face 52, 53, 54 shown in FIG. 10C. The flat faces 52, 53, 54 are formed on the projection 31a, 31b, 31c, respectively, and are arranged to be separated from each other in the longitudinal direction of the supporting portion 31.

A comparison example is described with reference to FIGS. 10E and 10F. A supporting portion 31' is made of the same material as the supporting portion 31, and has the same curved shape as the supporting portion 31. However, the supporting portion 31' does not have a trench corresponding to the trench 31d, 31e of the supporting portion 31.

In the comparison example, when the supporting portion 31' has the same surface fitting process as the supporting portion 31, an upper end face of the supporting portion 31' has a single flat face 51 extending in the longitudinal direction of the supporting portion 31'.

Figure 10F:
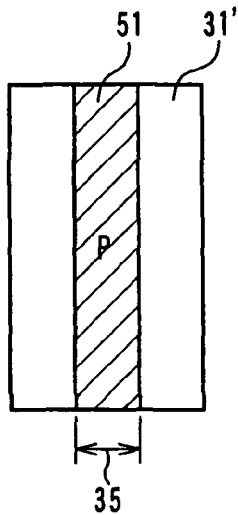
FIG. 10F is a plan view illustrating the supporting portion of the comparison example after having the surface fitting process.

As shown in FIGS. 10C and 10F, a width 35 of the flat face 51 of the comparison example is shorter than a width 36 of the flat face 52, 53, 54 of the embodiment. This is because an area of a flat face is determined by a hardness of an object, when the flat face is formed on the object by a predetermined stress. The hardness may correspond to a yield stress.

Therefore, when the same load is applied to the supporting portions 31, 31' made of the same material, the total area of the formed flat face is the same between the supporting portions 31, 31'. That is, when the flat face 51 has an area of P, and when the flat faces 52, 53, 54 have areas of Q, R, S, respectively, a relationship of P=Q+R+S is defined.

When the flat face 51 is compared with the flat faces 52, 53, 54, a total dimension of the flat faces 52, 53, 54 in the longitudinal direction of the supporting portion 31 is shorter than a dimension of the flat face 51 in the longitudinal direction of the supporting portion 31', because the supporting portion 31 has the trenches 31d, 31e. Therefore, the width 36 of the flat face 52, 53, 54 is longer than the width 35 of the flat face 51, such that the relationship of P=Q+R+S is defined.

Thus, the single rectangular flat face 51 is formed on the supporting portion 31' not having a trench by the surface fitting process, in the comparison example. In contrast, according to the present embodiment, the plural rectangular flat faces 52, 53, 54 are formed on the supporting portion 31 having the trenches 31d, 31e by the surface fitting process. The flat faces 52, 53, 54 are arranged to be separated from each other in the longitudinal direction of the supporting portion 31. The width 36 of the flat face 52, 53, 54 is longer than the width 35 of the flat face 51.

Figure 11:
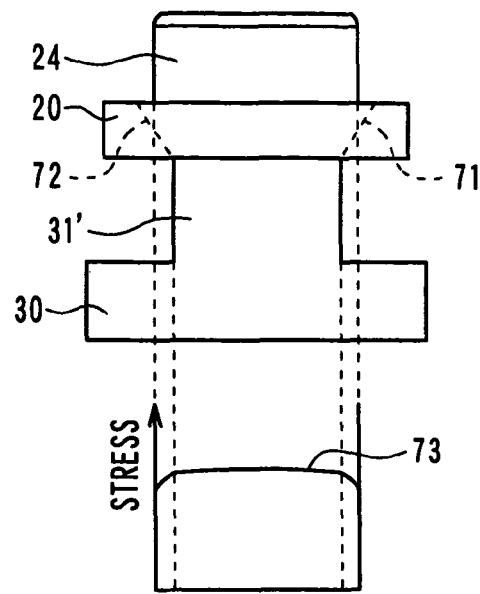
FIG. 11 is a graph illustrating a distribution of a stress applied by the supporting portion of the comparison example.
Figure 12:
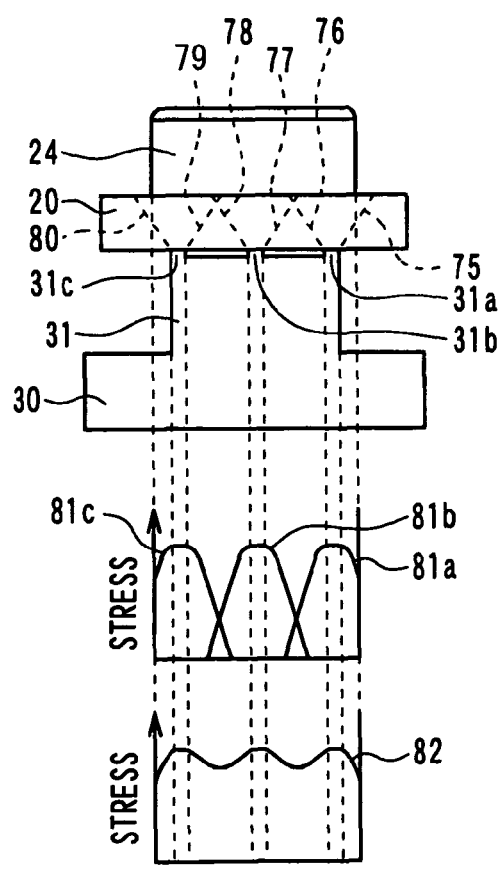
FIG. 12 is a graph illustrating a distribution of a stress applied by the supporting portion of the embodiment.

A concept of an equivalent contact area will be described below. FIG. 11 shows a distribution of a stress applied to an upper face of the board 20 by the supporting portion 31' of the comparison example. FIG. 12 shows a distribution of a stress applied to an upper face of the board 20 by the supporting portion 31 of the present embodiment.

In the comparison example, the supporting portion 31' contacts a lower face of the board 20 through the single flat face 51. When a stress is applied to the lower face of the board 20 from the supporting portion 31', and when the stress is transmitted from the lower face to the upper face of the board 20, the stress is spread as shown in a dashed line 71, 72 of FIG. 11. Therefore, the stress is transmitted to other part of the upper face of the board 20 other than a part of the lower face of the board 20 contacting with the supporting portion 31'. Thus, the upper face of the board 20 has a stress distribution shown in a solid line 73 of FIG. 11.

In contrast, according to the present embodiment, the supporting portion 31 contacts the lower face of the board 20 through the flat faces 52, 53, 54 of the projections 31a, 31b, 31c. When a stress is applied to the lower face of the board 20 from the supporting portion 31, and when the stress is transmitted, from the lower face to the upper face of the board 20, the stress is spread as shown in a dashed line 75, 76, 77, 78, 79, 80 of FIG. 12. Therefore, the upper face of the board 20 receives stresses 81a, 81b, 81c of FIG. 12 by the projections 31a, 31b, 31c, respectively. Thus, the stress is transmitted to other part of the upper face of the board 20 other than a part of the lower face of the board 20 contacting with the supporting portion 31.

Further, according to the present embodiment, the upper face of the board 20 has an area in which the stresses applied from the projections 31a, 31b, 31c are overlap with each other. A sum of the stresses is applied to the area of the upper face of the board 20. Thus, the upper face of the board 20 has a stress distribution shown in a solid line 82 of FIG. 12. The stress distribution of the solid line 82 is equivalent to the stress distribution of the solid line 73 of FIG. 11 of the comparison example.

That is, in a viewpoint of the stress distribution applied to the upper face of the board 20, as shown in FIG. 10C, the flat faces 52, 53, 54 separated from each other are equivalent with a single flat face having an equivalent length 37.

Figure 10D:
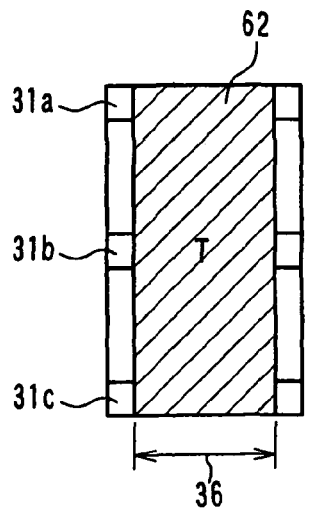
FIG. 10D is a plan view illustrating an equivalent contact area of the supporting portion of the embodiment.

FIG. 10D shows an equivalent contact area T of a rectangle 62 constructed by the equivalent length 37 and the width 36. When a stress is applied from the flat faces 52, 53, 54 to the lower face of the board 20, the equivalent contact area T is determined by an area X of the upper face of the board 20 receiving a predetermined stress. That is, if the area X is assumed to be realized by only a single flat face Y contacting with the lower face of the board 20, the equivalent contact area T is defined by an area of the single flat face Y.

Figure 10G:
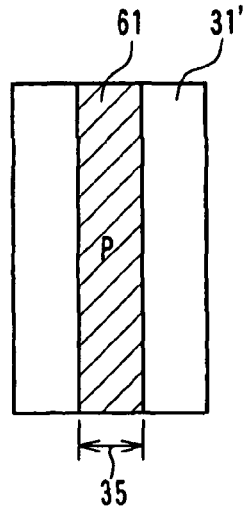
FIG. 10G is a plan view illustrating an equivalent contact area of the supporting portion of the comparison example.

After the surface fitting process, when the rectangle 62 of the supporting portion 31 of FIG. 10D is compared with a rectangle 61 of the supporting portion 31' of FIG. 10G, a longitudinal dimension of the rectangle 61, 62 is the same between the supporting portions 31, 31', and the width 36 of the flat face 62 is longer than the width 35 of the flat face 61. FIG. 10D shows the present embodiment, and FIG. 10G shows the comparison example. Therefore, the equivalent contact area T of the present embodiment is larger than an equivalent contact area P of the comparison example.

Figure 13:
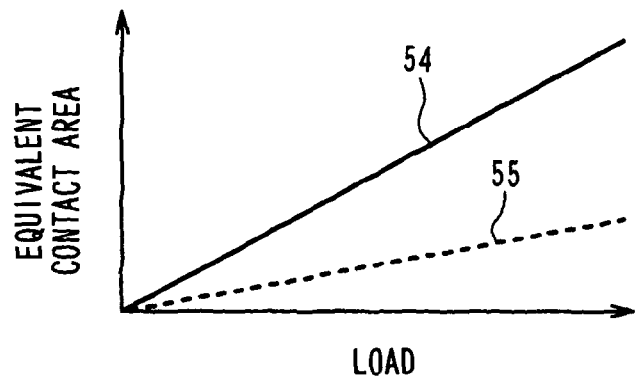
FIG. 13 is a graph illustrating a relationship between a load applied in the surface fitting process and the equivalent contact area relative to the embodiment and the comparison example.

FIG. 13 shows a relationship between a load of the surface fitting process and the equivalent contact area, relative to a case 54 of the present embodiment in which the supporting portion 31 has the trenches 31d, 31e, and a case 55 of the comparison example in which the supporting portion 31' does not have a trench. As shown in FIG. 13, when the same load is applied in the surface fitting process, the equivalent contact area of the case 54 of the present embodiment can be larger than that of the case 55 of the comparison example. That is, the equivalent contact area can be increased by the trenches 31d, 31e.

According to the embodiment, the trench 31d, 31e is formed in the curved shape of the supporting portion 31, such that the supporting portion 31 has the projections 31a, 31b, 31c separated from each other. Therefore, when the surface fitting process is performed, stress can be effectively applied to the lower face of the board 20, because the equivalent contact area is made larger. Accordingly, a distribution of a stress applied to the resistor 21, 22 can be stable and uniform for a long time, such that a load-withstanding strength of the resistor 21, 22 can be increased.

An interval of the projections 31a, 31b, 31c located adjacent to each other may be equal to or smaller than a thickness of the board 20. When the interval is too large, the stresses applied to the upper face of the board 20 do not overlap with each other. For example, the interval of the projections 31a, 31b, 31c is made equal to the thickness of the board 20, in this embodiment.

The upper end face of the projection 31a, 31b, 31c, 32a, 32b, 32c of the supporting portion 31, 32 has a curved shape protruding upward. Specifically, in a cross-section of the supporting portion 31, 32 cut in a direction approximately perpendicular to the longitudinal direction of the supporting portion 31, 32, for example, the projection 31a, 31b, 31c, 32a, 32b, 32c of the supporting portion 31, 32 has an arch shape protruding upward. Advantages of the arch shape will be described with reference to FIGS. 14 and 15.

The supporting portions 31, 32 are designed to have the same heights. However, a slight difference may be generated between the heights of the supporting portions 31, 32. If the slight difference is generated, the board 20 is inclined relative to the main board 30 of the metal base 3, when the board 20 is arranged on the supporting portions 31, 32.

Figure 14:
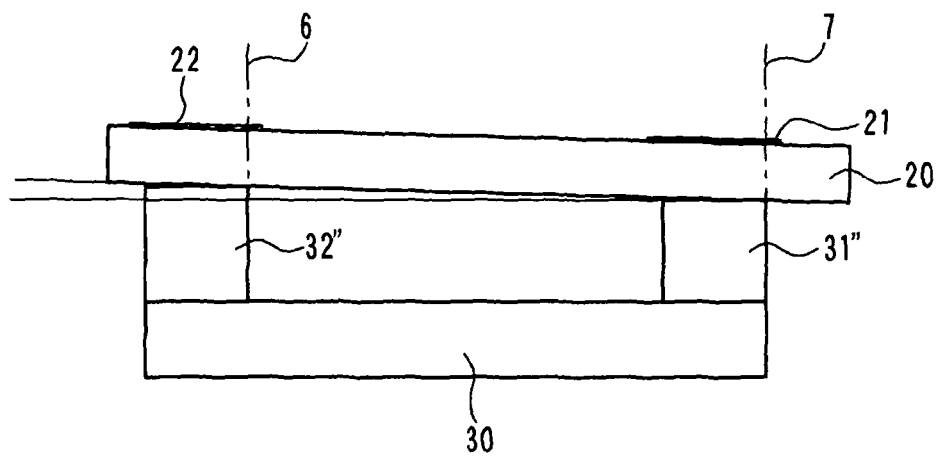
FIG. 14 is a front view illustrating a contact position between a supporting portion and a substrate of a comparison example.

FIG. 14 shows a comparison example, in which an upper end of a supporting portion 31", 32" has a flat shape. In the comparison example, the supporting portion 31", 32" contacts the board 20 at a right end 6, 7 of FIG. 14. Thus, a contact position between the board 20 and the supporting portion 31", 32" may be concentrated at a periphery portion of the resistor 21, 22. Therefore, a pressure may not uniformly be applied to the resistor 21, 22.

Figure 15:
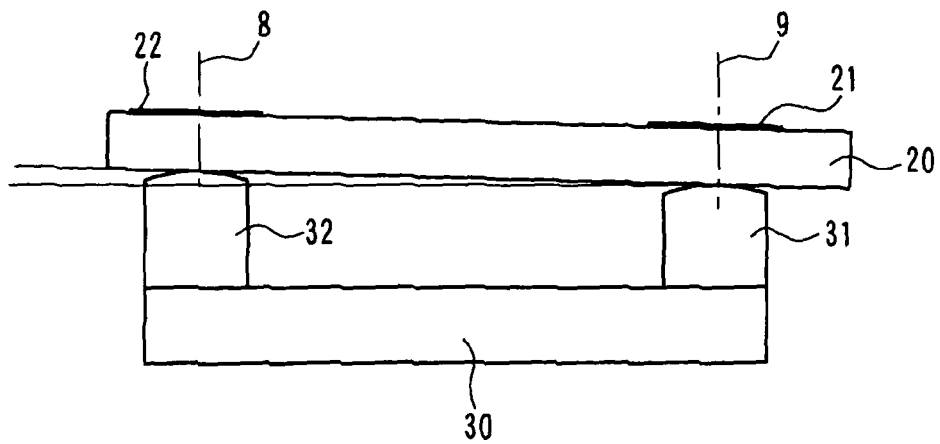
FIG. 15 is a front view illustrating a contact position between the supporting portion and the substrate of the embodiment.

In contrast, according to the present embodiment, as shown in FIG. 15, the upper end face of the supporting portion 31, 32 has the curved shape. Even when the board 20 is inclined, a contact point 8, 9 between the board 20 and the supporting portion 31, 32 is located adjacent to an approximately center position of the supporting portion 31, 32. Thus, a contact position between the board 20 and the supporting portion 31, 32 is located adjacent to an approximately center position of the resistor 21, 22.

That is, a position relationship between the receiver 24, 25 and the supporting portion 31, 32 is less affected by an inclination of the board 20. Thus, a pressure can be uniformly applied to the resistor 21, 22.

The present embodiment may be modified within the scope of the present invention as defined by the appended claims.

The resistor 21, 22 detects a stress applied to the resistor 21, 22, as a stress sensitive member. Alternatively, a distortion gauge or a piezoelectric element may be used as the stress sensitive member.

The supporting portion 31, 32 has three of the projections 31a, 31b, 31c, 32a, 32b, 32c separated by two of the trenches 31d, 31e, 32d, 32e. However, the number of the projections is not limited to three, and the number of the trenches is not limited to two. Alternatively, the supporting portion 31, 32 may have two of the projections separated by a single trench, or the supporting portion 31, 32 may have four of the projections separated by three of the trenches.

The metal base 3 includes two of the supporting portions 31, 32 to support the board 20. Alternatively, the metal base 3 may includes only one of the supporting portions 31, 32.

The dimensions of the metal base 3 are not limited to the above description and FIGS. 7 and 8. A scale of the metal base 3 may be increased or decreased by maintaining a ratio of the dimensions. Further, the ratio of the dimensions may be changed.

The device 1 is used for detecting the force applied on the brake pedal of the automobile. However, the device 1 is not limited to detect the force applied on the brake pedal of the automobile. The device 1 may be used for detecting any load applied to the receiver 24, 25.

Such changes and modifications are to be understood as being within the scope of the present invention as defined by the appended claims.

What is claimed is:

1. A load detecting device comprising:
a substrate;
a load receiver arranged on a first face of the substrate so as to receive a load;
a load detecting element arranged between the substrate and the load receiver so as to detect the load; and
a supporting portion to support the substrate, wherein
the supporting portion is made of metal,
the supporting portion is located to overlap with the load receiver in a direction approximately perpendicular to the substrate,
the supporting portion has a plurality of projections contacting with a second face of the substrate opposite from the first face, and
the projections located adjacent to each other are distanced from each other through a trench.

2. The load detecting device according to claim 1, wherein the plurality of projections has a curved shape protruding toward the substrate.

3. The load detecting device according to claim 1, wherein
the load receiver has a first area contacting with the load detecting element,
the supporting portion has a second area opposing to the substrate, and
all of the second area is overlap with the first area in the direction approximately perpendicular to the substrate.

4. The load detecting device according to claim 1, wherein the supporting portion supports the substrate only through the plurality of the projections.

5. The load detecting device according to claim 1, wherein two of the projections are located on both end portions of the supporting portion in a longitudinal direction.

6. The load detecting device according to claim 1, wherein the projection has a longitudinal direction approximately perpendicular to a longitudinal direction of the supporting portion.

7. A method of producing a load detecting device comprising:
arranging a load receiver on a first face of a substrate through a load detecting element;
arranging a supporting portion on a second face of the substrate opposite from the first face, the supporting portion having a plurality of projections contacting with the second face of the substrate, the projections located adjacent to each other being distanced from each other through a trench; and
forming a flat face on a curved face of the projection of the supporting portion, wherein
the arranging of the supporting portion is performed such that the supporting portion is located to overlap with the load receiver in a direction approximately perpendicular to the substrate, and
the forming of the flat face is performed by applying a load on the load receiver, such that the flat face of the projection is fitted to the second face of the substrate.

8. The method according to claim 7, wherein the step of arranging the supporting portion on the second faces of the substrate includes directly contacting the second face of the substrate with the supporting portion.

9. The method according to claim 7, wherein the step of arranging the supporting portion on the second face of the substrate includes directly contacting the second face of the substrate with each of the plurality of projections.

10. The load detecting device according to claim 1, wherein the supporting portion directly contacts the substrate.

11. The load detecting device according to claim 1, wherein each of the plurality of projections directly contacts the substrate.

* * * * *